US012764676B2

(12) United States Patent
Venugopal et al.

(10) Patent No.: US 12,764,676 B2
(45) Date of Patent: Oct. 13, 2026

(54) PRECODER SELECTION USING POWER ADJUSTMENT INFORMATION

(71) Applicant: QUALCOMM Incorporated, San Diego, CA (US)

(72) Inventors: Kiran Venugopal, Green Brook, NJ (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/465,298

(22) Filed: Sep. 12, 2023

(65) Prior Publication Data

US 2025/0088984 A1 Mar. 13, 2025

(51) Int. Cl.

| | |
|---|---|
| ***H04W 52/34*** | (2009.01) |
| ***H04B 7/0456*** | (2017.01) |
| ***H04B 7/06*** | (2006.01) |
| ***H04L 1/00*** | (2006.01) |
| ***H04W 24/02*** | (2009.01) |
| ***H04W 52/02*** | (2009.01) |
| ***H04W 52/22*** | (2009.01) |
| ***H04W 52/36*** | (2009.01) |

(52) U.S. Cl.
CPC ........ *H04W 52/346* (2013.01); *H04B 7/0456* (2013.01); *H04B 7/0626* (2013.01); *H04L 1/0031* (2013.01); *H04W 52/0235* (2013.01); *H04W 52/22* (2013.01); *H04W 52/226* (2013.01); *H04W 52/367* (2013.01); *H04W 24/02* (2013.01)

(58) Field of Classification Search
CPC ......... H04W 52/0203; H04W 52/0209; H04W 52/0212; H04W 52/0219; H04W 52/0235; H04W 52/0225; H04W 52/0229; H04W 52/22; H04W 52/226; H04W 52/34; H04W 52/346; H04W 52/367; H04W 24/02; H04W 16/02; H04W 16/10; H04B 7/0456; H04B 7/0626; H04L 1/0031
See application file for complete search history.

(56) References Cited

U.S. PATENT DOCUMENTS

| | | | | |
|---|---|---|---|---|
| 12,289,145 | B2 * | 4/2025 | Sun | H04B 7/024 |
| 2017/0013570 | A1 * | 1/2017 | Vajapeyam | H04W 72/21 |
| 2021/0144648 | A1 * | 5/2021 | Huang | H04W 52/54 |
| 2021/0359891 | A1 * | 11/2021 | Lee | H04L 27/2636 |
| 2022/0069877 | A1 * | 3/2022 | Raghavan | H04B 7/06952 |
| 2022/0338126 | A1 * | 10/2022 | Soltani | H04W 52/52 |
| 2022/0385104 | A1 * | 12/2022 | Elshafie | H04L 5/0023 |
| 2023/0042073 | A1 * | 2/2023 | Ibrahim | H04W 52/24 |
| 2023/0074893 | A1 * | 3/2023 | Zhang | H04W 52/146 |

(Continued)

*Primary Examiner* — Joshua Kading
(74) *Attorney, Agent, or Firm* — Norton Rose Fulbright US LLP

(57) ABSTRACT

An apparatus for wireless communication by a user equipment (UE) includes a receiver and a transmitter. The receiver is configured to receive a message indicating power adjustment information associated with one or more transmission and reception points (TRPs) and to receive a transmission of a reference signal via the one or more TRPs. The transmitter is configured to transmit, in accordance with the power adjustment information and the transmission of the reference signal, a measurement report indicating precoder information associated with the one or more TRPs.

30 Claims, 5 Drawing Sheets

(56) References Cited

U.S. PATENT DOCUMENTS

| | | | | |
|---|---|---|---|---|
| 2023/0180144 | A1* | 6/2023 | Raghavan ........... | H04W 52/143 455/522 |
| 2023/0284196 | A1* | 9/2023 | Li ......................... | H04W 72/23 370/329 |
| 2023/0291453 | A1* | 9/2023 | Chou ....................... | H04B 7/10 |
| 2024/0154666 | A1* | 5/2024 | Venugopal ........... | H04B 7/0639 |

* cited by examiner

PRECODER SELECTION USING POWER ADJUSTMENT INFORMATION

TECHNICAL FIELD

Aspects of the present disclosure relate generally to wireless communication systems, and more particularly, to precoder selection for a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

Wireless communication systems may use transmission and reception points (TRPs) to perform transmissions, such as multiple input, multiple output (MIMO) transmissions, between UEs and base stations. To enable such transmissions, a UE may receive a reference signal transmitted by multiple TRPs and may report, to a base station, information that is used by the base station to configure the TRPs for transmissions to the UE. For example, the UE may report precoder matrix indicators (PMIs) indicating precoding matrices to be applied to signals transmitted by the TRPs.

In some cases, PMIs reported by a UE may be associated with reduced performance in a wireless communication system. For example, in some circumstances, PMIs reported by a UE may be associated with a power imbalance in which a relatively large amount of power is allocated to a relatively small number of TRPs, such as one TRP. To avoid such scenarios, some wireless communication systems may clip or limit power allocated to TRPs. However, after changing the allocation of power to the TRPs, the particular PMIs selected by the UE may be less effective or suboptimal. As a result, reliability of communications between a base station and a UE may be reduced due to the less effective or suboptimal PMIs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, an apparatus for wireless communication by a user equipment (UE) includes a receiver and a transmitter. The receiver is configured to receive a message indicating power adjustment information associated with one or more transmission and reception points (TRPs) and to receive a transmission of a reference signal via the one or more TRPs. The transmitter is configured to transmit, in accordance with the power adjustment information and the transmission of the reference signal, a measurement report indicating precoder information associated with the one or more TRPs.

In an additional aspect of the disclosure, a method of wireless communication performed by a UE includes receiving a message indicating power adjustment information associated with one or more TRPs. The method further includes receiving a transmission of a reference signal via the one or more TRPs and transmitting, in accordance with the power adjustment information and the transmission of the reference signal, a measurement report indicating precoder information associated with the one or more TRPs.

In an additional aspect of the disclosure, an apparatus for wireless communication by a network node includes a transmitter and a receiver. The transmitter is configured to transmit a message indicating power adjustment information associated with one or more TRPs and to transmit a reference signal via the one or more TRPs. The receiver is configured to receive, in accordance with the power adjustment information and the transmission of the reference signal, a measurement report indicating precoder information associated with the one or more TRPs.

In an additional aspect of the disclosure, a method of wireless communication performed by a network node includes transmitting a message indicating power adjustment information associated with one or more TRPs. The method further includes transmitting a reference signal via the one or more TRPs and receiving, in accordance with the power adjustment information and the transmission of the reference signal, a measurement report indicating precoder information associated with the one or more TRPs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
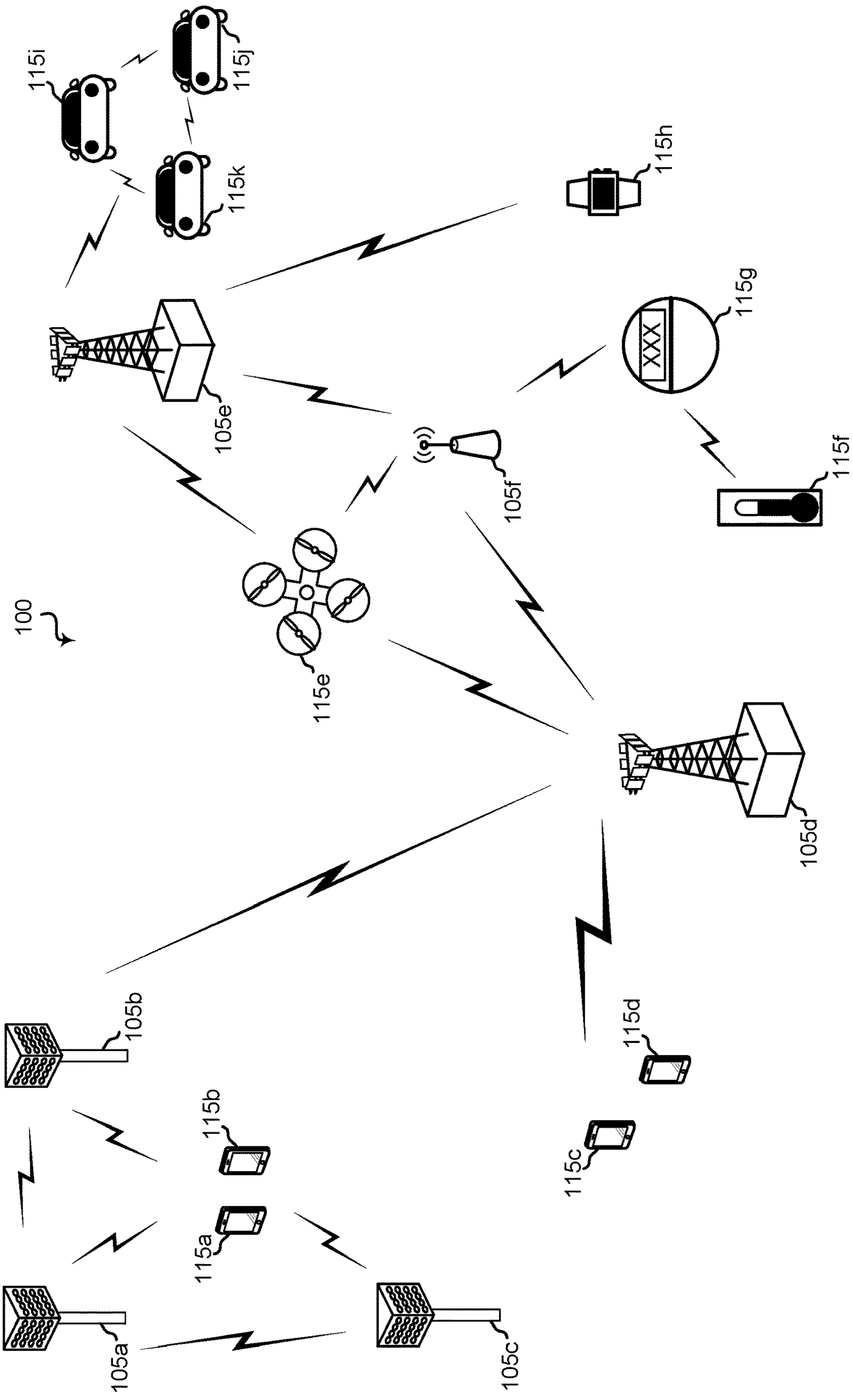
FIG. 1 is a block diagram illustrating details of an example wireless communication system that supports precoder selection using power adjustment information according to one or more aspects.

In some aspects of the disclosure, a user equipment (UE) may receive a reference signal and may transmit a first measurement report to a network node in accordance with the reference signal. For example, the first measurement report may correspond to a channel state information (CSI) measurement report that indicates a first set of precoder matrix indicators (PMIs) for a set of transmission and reception points (TRPs) selected by the UE in accordance with the reference signal.

In some circumstances, the network node may transmit a message to the UE including power adjustment information that indicates (explicitly or implicitly) amplitude backoff values associated with the set of TRPs. For example, if the network node determines that the first set of PMIs may cause power allocation among the TRPs to exceed a power constraint associated with the TRPs (such as a maximum transmit power), the network node may transmit the message to the UE including the power adjustment information. The UE may update (or "refine") the first set of PMIs in accordance with the amplitude backoff values to generate a second set of PMIs and may report the second set of PMIs to the network node, such as via a second measurement report.

By updating such PMIs that may result in exceeding a power constraint, a network node may avoid using PMIs that may involve or necessitate clipping or limiting TRP power, which may be associated with less effective or suboptimal precoding. Accordingly, the UE may in some instances perform a "second pass" to reselect PMIs based on such a power constraint, which may enable improved precoder selection and improved reliability of communication between the UE and the network node.

In various implementations, one or more features described herein may be used for wireless communication networks, such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology.

Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-

115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
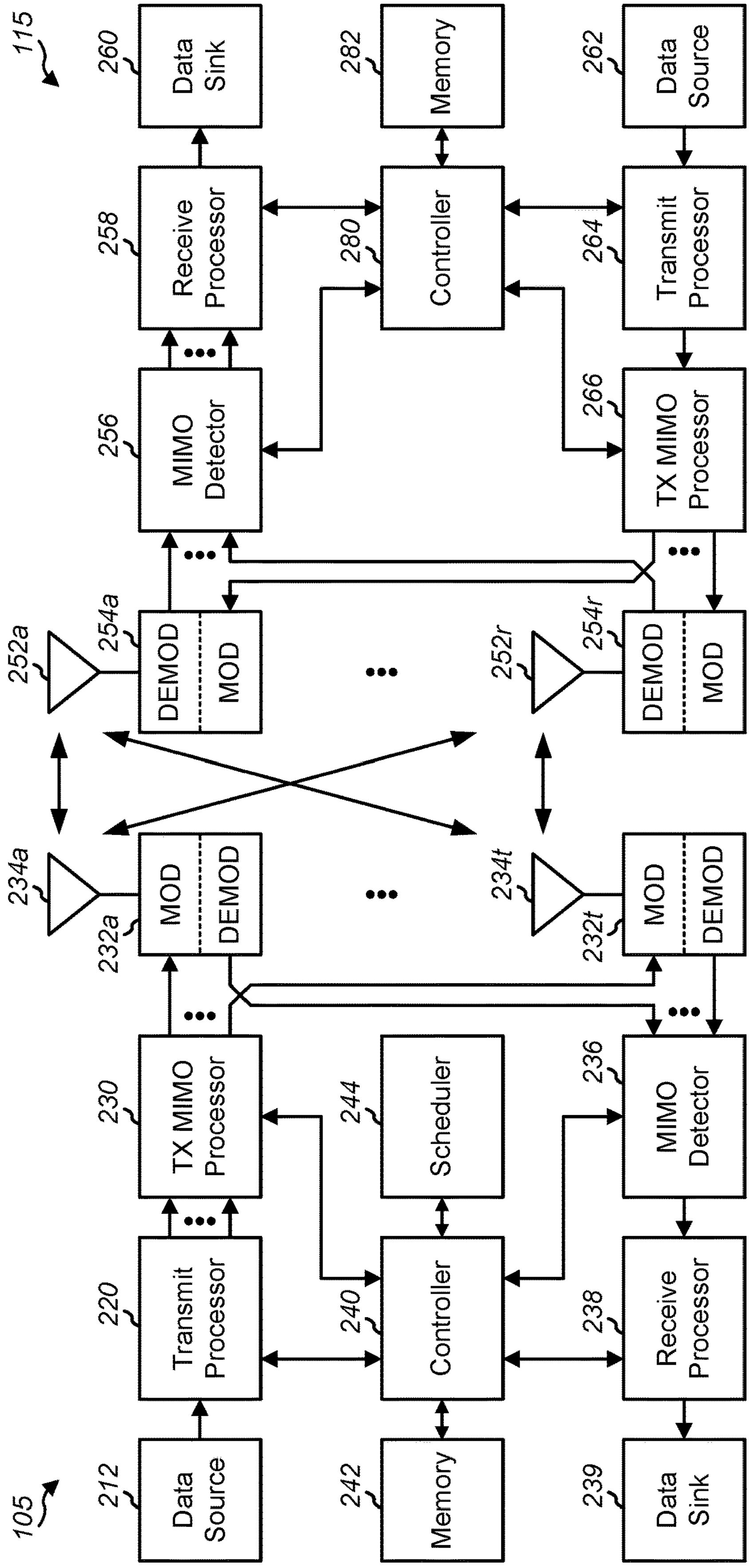
FIG. 2 is a block diagram illustrating examples of a base station and a user equipment (UE) that support precoder selection using power adjustment information according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
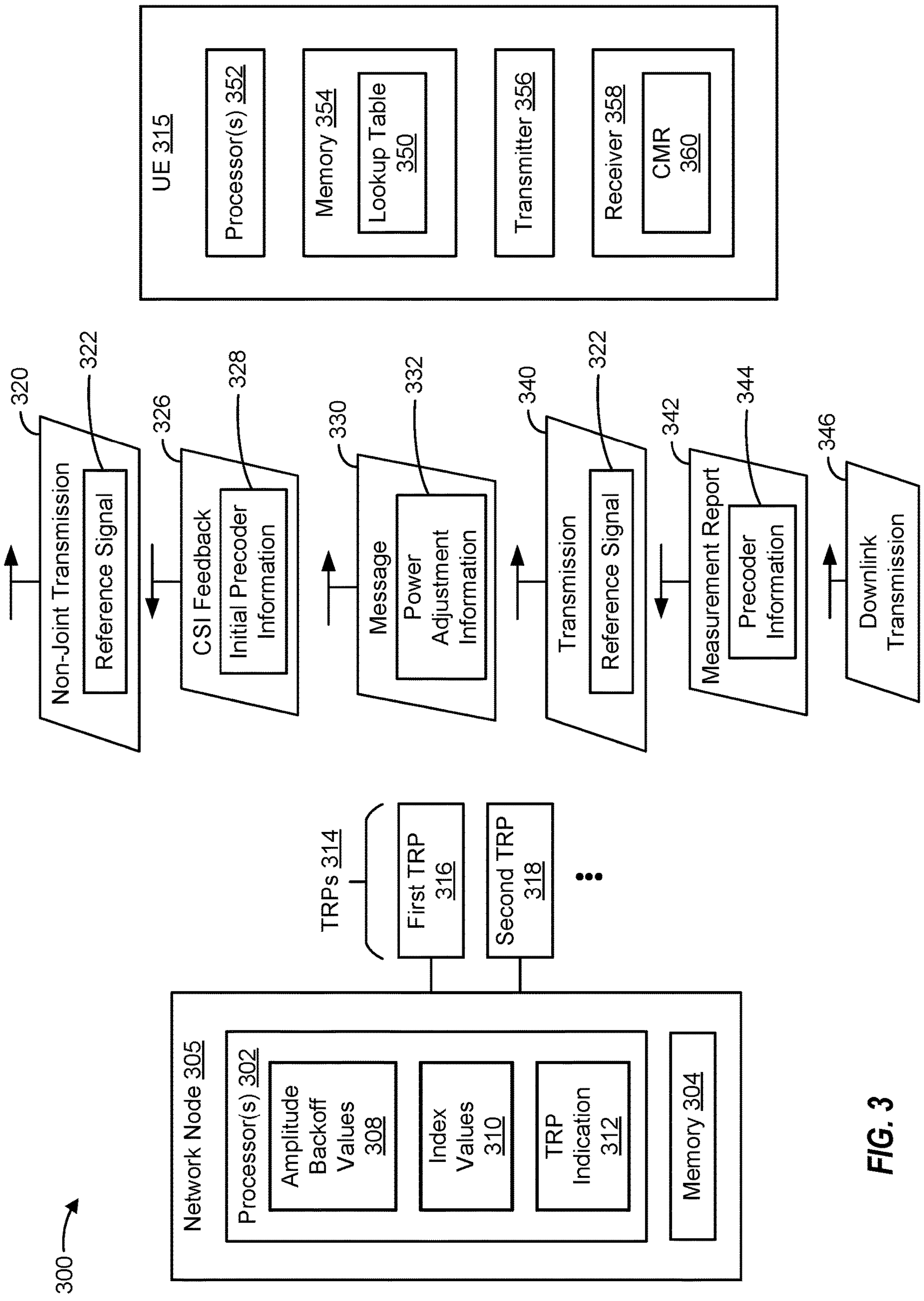
FIG. 3 is a block diagram illustrating an example wireless communication system that supports precoder selection using power adjustment information according to one or more aspects.

FIG. 3 is a block diagram illustrating an example wireless communication system 300 that supports precoder selection using power adjustment information according to one or more aspects. The wireless communication system 300 may include a UE 315 (such as the UE 115). The wireless communication system 300 may also include one or more network nodes, such as a network node 305. In some examples, the network node 305 may be implemented as a base station, such as the base station 105. To further illustrated, the network node 305 may be implemented as a base station, a network controller, an integrated access and backhauling (IAB) node, a distributed unit (DU), a central unit (CU), or a remote/radio unit (RU) (which may also be referred to as a remote radio unit (RRU)), as illustrative examples. A network node may also be referred to herein as a network entity.

The network node 305 may include one or more processors 302 (such as the controller 240) and a memory 304 (such as the memory 242). The one or more processors 302 may be coupled to the memory 304. The network node 305 may also include or may be coupled to one or more transmission and reception points (TRPs), such as TRPs 314. In the example of FIG. 3, the TRPs 314 may include a first TRP 316 and a second TRP 318. In some other examples, the TRPs 314 may include a different quantity of TRPs, such as one TRP, three TRPs, four TRPs, or another quantity of TRPs. In some examples, each TRP of the TRPs 314 may include one or more components described with reference to FIG. 2, such as one or more of the modulator/demodulators 232*a-t*, the MIMO detector 236, the receive processor 238, the transmit processor 220, or the TX MIMO processor 230. In some examples, the one or more processors 302 may be individually or collectively operable to perform one or more operations described herein, such as using the TRPs 314.

The TRPs 314 may be configured to transmit reference signals, synchronization signals, control information, and data to one or more other devices and to receive reference signals, control information, and data from one or more other devices. For example, the TRPs 314 may be configured to transmit signaling, control information, and data to the UE 315 and to receive signaling, control information, and data from the UE 315.

The UE 315 may include one or more processors 352 (such as the controller 280), a memory 354 (such as the memory 282), a transmitter 356, and a receiver 358. The one or more processors 352 may be coupled to the memory 354, to the transmitter 356, and to the receiver 358. In some examples, the transmitter 356 and the receiver 358 may include one or more components described with reference to FIG. 2, such as one or more of the modulator/demodulators 254*a-r*, the MIMO detector 256, the receive processor 258, the transmit processor 264, or the TX MIMO processor 266. In some implementations, the transmitter 356 and the receiver 358 may be integrated in one or more transceivers of the UE 315. In some examples, the one or more processors 352 may be individually or collectively operable to perform one or more operations described herein.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the network node 305, and the receiver 358 may receive signaling, control information, and data from the network node 305.

The wireless communication system 300 may use wireless communication channels, which may be specified by one or more wireless communication protocols, such as a 5G NR wireless communication protocol. To illustrate, the network node 305 may communicate with the UE 315 using one or more downlink wireless communication channels (such as via one or more of a PDSCH or a PDCCH). The UE 315 may communicate with the network node 305 using one or more uplink wireless communication channels (such as via one or more of a PUSCH or a PUCCH). Alternatively, or in addition, the UE 315 may communicate with one or more other UEs, such as via a sidelink wireless communication channel.

During operation, the network node 305 may perform a non-joint transmission 320 of a reference signal 322. The non-joint transmission 320 may include or correspond to a non-MIMO transmission, such as a single-input, single-output (SISO) transmission. In some examples, the reference signal 322 may correspond to a channel state information reference signal (CSI-RS) or another reference signal. The UE 315 may receive the non-joint transmission 320. In some examples, the network node 305 may configure the UE 315 with channel measurement resources (CMR) 360, and the UE 315 may receive the non-joint transmission 320 based on the CMR 360, such as by measuring the reference signal 322 based on the CMR 360.

The UE 315 may transmit channel state information (CSI) feedback 326 to the network node 305 in accordance with the reference signal 322. The CSI feedback may indicate initial precoder information 328. For example, the initial precoder information 328 may include, based on the reference signal 322, one or more precoder matrix indicators (PMIs) indicating an initial selection of one or more precoding matrices to be applied to the TRPs 314. In some examples, the CSI feedback 326 includes a selection of TRPs of the TRPs 314. To illustrate, if the TRPs 314 include four TRPs, the selection may indicate selection of one, two, three, or four of the TRPs. Other examples are also within the scope of the disclosure. In some examples, the UE 315 may select the initial precoder information 328 using a codebook, such as in accordance with a type-II codebook associated with a 5G NR wireless communication protocol, as an illustrative example. In some implementations, the codebook may have a size of $N_t$ rows by $N_3$ columns, where $N_t$ may indicate a number of transmit antennas associated with the TRPs 314, and where $N_3$ may indicate a quantity of PMI matrices.

To further illustrate, in some implementations, the UE 315 may determine the initial precoder information 328 in accordance with Equation 1:

$$\begin{bmatrix} F_1^{(\ell)} \\ \vdots \\ F_N^{(\ell)} \end{bmatrix} = \begin{bmatrix} W_{1,1}\tilde{W}_{2,1}^{(\ell)}W_{f,1}^{*(\ell)} \\ \vdots \\ W_{1,N}\tilde{W}_{2,N}^{(\ell)}W_{f,N}^{*(\ell)} \end{bmatrix} = \begin{bmatrix} W_{1,1} & \cdots & 0 \\ \vdots & & \vdots \\ 0 & \cdots & W_{1,N} \end{bmatrix} \times \begin{bmatrix} \tilde{W}_{2,1}^{(\ell)} & \cdots & 0 \\ \vdots & & \vdots \\ 0 & \cdots & \tilde{W}_{2,N}^{(\ell)} \end{bmatrix} \times \begin{bmatrix} W_{f,1}^{*(\ell)} \\ \vdots \\ W_{f,N}^{*(\ell)} \end{bmatrix}. \quad \text{(Equation 1)}$$

In the example of Equation 1, $F_k^{(\ell)}$ may indicate a precoder used by the kth TRP of the TRPs 314 for each layer $\ell$, $W_{1,k}$ may indicate a spatial domain (SD) matrix for layer $\ell$, $\tilde{W}^{(\ell)}_{2,k}$ may indicate a coefficient matrix for layer $\ell$, and $W_{f,k}^{*(\ell)}$ may indicate a complex conjugate transpose of a frequency domain (FD) basis matrix for layer $\ell$, where k=1, 2, . . . , N, and where N indicates a positive integer greater than two.

The network node 305 may determine one or more amplitude backoff values respectively associated with one or more of the TRPs 314. For example, the network node 305 may determine amplitude backoff values 308 respectively associated with the TRPs 314. In some examples, the network node 305 may apply the amplitude backoff values 308 to signals transmitted by the TRPs 314 to reduce amplitude of the signals. By applying the amplitude backoff values 308 to signals transmitted by the TRPs 314, the network node 305 may avoid exceeding a power constraint associated with one or more of the TRPs 314.

To further illustrate, in some examples, the amplitude backoff values 308 may be indicated as $P_k$ (where k=1, 2, . . . , N), and the network node 305 may determine the initial precoder information 328 in accordance with Equation 2:

$$F^{opt} = \begin{pmatrix} \underset{F}{\text{argmax}} \log\left| I + \frac{\rho}{\sigma^2} F^* H^* H F \right| \\ \text{such that } F = \begin{bmatrix} F_1 \\ \vdots \\ F_N \end{bmatrix}, \text{ and} \\ \text{trace}(F_k F_k^*) \le p_k,\ k = 1, 2, \ldots, N \end{pmatrix}. \quad \text{(Equation 2)}$$

In Equation 2, $F^{opt}$ may indicate a precoder indicated by the initial precoder information 328, I may indicate an identity matrix, H may indicate a channel estimate of a wireless communication channel between the network node 305 and the UE 315, $\sigma^2$ may indicate a noise variance, and $\rho$ may indicate an average transmit power of the desired signal, so that $$\frac{\rho}{\sigma^2}$$

corresponds to a desired signal to noise ratio (SNR).

The network node 305 may transmit a message 330 to the UE 315 indicating power adjustment information 332 associated with the amplitude backoff values 308. In some examples, the power adjustment information 332 may include the amplitude backoff values 308. In some other examples, the power adjustment information 332 may implicitly indicate the amplitude backoff values 308 (e.g., instead of explicitly indicating the amplitude backoff values 308). To illustrate, in some examples, the power adjustment information 332 may include one or more index values to a lookup table 350 indicating one or more amplitude backoff values. For example, the power adjustment information 332 may include index values 310, and the UE 315 may access the lookup table 350 in accordance with the index values 310 to determine the amplitude backoff values 308.

Alternatively or in addition to explicitly or implicitly indicating the amplitude backoff values 308, the power adjustment information 332 may include a TRP indication 312. The TRP indication 312 may indicate a particular TRP of the TRPs 314 that is associated with the power adjustment information 332. For example, the TRP indication 312 may identify one or more of the TRPs 314 subject to a power constraint that is associated with (or that results in) the amplitude backoff values 308. In some examples, the TRP indication 312 may include one or more of a channel resource indicator (CRI) associated with the particular TRP, a value (e.g., an index value) associated with the particular TRP, or a bitmap associated with the TRPs 314. To further illustrate, the bitmap may include a set of bits, where each bit is associated with a respective TRP of the TRPs 314, and where a value of each bit indicates whether the respective TRP is subject to the power constraint.

The network node 305 may perform a transmission 340 of a reference signal, such as the reference signal 322. The network node 305 may perform the transmission 340 using one or more of the TRPs 314. In some examples, the transmission 340 may include or correspond to a joint transmission or a MIMO transmission. In some other examples, the transmission 340 may correspond to another transmission, such as a non-joint transmission. The network node 305 may perform the transmission 340 using the amplitude backoff values 308 and the initial precoder information 328. For example, the network node 305 may apply one or more precoding matrices to the reference signal 322 in accordance with the initial precoder information 328 and may limit amplitude of the reference signal 322 in accordance with the amplitude backoff values 308.

The UE 315 may receive the transmission 340 of the reference signal 322. The UE 315 may determine precoder information 344 in accordance with the transmission 340 of the reference signal 322. For example, the precoder information 344 may correspond to a "refined" version of the initial precoder information 328 that is in accordance with the amplitude backoff values 308. The precoder information 344 may include one or more PMIs indicating a selection of one or more precoding matrices to be applied to the TRPs 314. The UE 315 may transmit a measurement report 342 in accordance with the power adjustment information 332 and the transmission 340, and the measurement report 342 may indicate the precoder information 344. In some examples, the UE 315 may select the precoder information 344 using a codebook, such as in accordance with a type-II codebook associated with a 5G NR wireless communication protocol, as an illustrative example. In some examples, the CSI feedback 326 may include an initial version of CSI, and the measurement report 342 may include an updated version of the CSI.

The UE 315 may determine the precoder information 344 in accordance with one or more techniques. In an illustrative example, the UE 315 may determine the precoder information 344 in accordance with Equations 3-6:

$$\max_{\{\delta_k\}} \sum_k \log\left(1 + SNR * \sigma_k^2 * \delta_k^2\right) \quad \text{(Equation 3)}$$

such that $$\sum_k |v_{j,k}|^2 \delta_k^2 \le p_j,\ j = 1, 2, \ldots, N.$$

$$H = [\, H_1 W_{1,1} \quad H_2 W_{1,2} \quad \ldots \quad H_N W_{1,N} \,] = U_H \Lambda_H V_H^*. \quad \text{(Equation 4)}$$

$$\tilde{F} = V_H \Delta. \quad \text{(Equation 5)}$$

$$\Delta = \text{diag}(\{\delta_k\}). \quad \text{(Equation 6)}$$

In Equation 3, SNR may indicate a signal-to-noise ratio (SNR) associated with the transmission 340, $\sigma_k$ may indicate SVD parameters associated with the SVD of the channel estimate H, $\delta_k$ may indicate the kth entry of a diagonal matrix $\Delta$, $V_{j,k}$ may indicate the (j,k)th entry of a matrix $V_H$, and $P_j$ may indicate the jth value of the amplitude backoff values 308. In Equation 4, each $W_{1,j}$ may be determined in accordance with the CSI feedback 326 and in accordance with Equation 1 (above). For example, $W_{1,j}$ may be indicated by the initial precoder information 328 of the CSI feedback 326. In Equation 5, $\tilde{F}$ may indicate precoders that may be included in the precoder information 344 (e.g., an updated or "refined" version of the initial precoder information 328 in accordance with the amplitude backoff values 308).

Accordingly, the UE 315 may determine the precoder information 344 using one or more parameters, such as parameters of Equations 3-6. To illustrate, as shown in the examples of Equations 3-6, the UE 315 may determine the precoder information 344 in accordance with the amplitude backoff values 308, such as by updating (or "refining") the initial precoder information 328 based on the amplitude backoff values 308.

In some examples, the CSI feedback 326 and the measurement report 342 may be associated with different periodicities. For example, the CSI feedback 326 may be associated with a first periodicity, and the measurement report 342 may be associated with a second periodicity that is different than the first periodicity. In some other examples, the CSI feedback 326 and the measurement report 342 may be associated with a same periodicity.

To further illustrate, in some examples, the network node 305 may selectively request or trigger the UE 315 to update the initial precoder information 328 by determining the precoder information 344. To illustrate, in some circumstances, the initial precoder information 328 may not cause any of the TRPs 314 to exceed the amplitude backoff values 308. In some such examples, the network node 305 may decline to trigger precoder refinement by the UE 315, such as by declining to send the power adjustment information 332 to the UE 315. In other circumstances, the network node 305 may trigger precoder refinement, such as based on determining that the initial precoder information 328 is associated with one or more of the TRPs 314 exceeding the amplitude backoff values 308. As a result, by triggering precoder refinement dynamically or on a "case-by-case" basis in some implementations, the periodicity of the CSI feedback 326 may differ from the periodicity of the measurement report 342.

The network node 305 may receive the measurement report 342 and may perform one or more subsequent transmissions in accordance with the precoder information 344. For example, the network node 305 may perform a downlink transmission 346 to the UE 315 in accordance with the precoder information 344. In some examples, the downlink transmission 346 may correspond to a physical downlink shared channel (PDSCH) transmission or another transmission. In some examples, the downlink transmission 346 may be a joint transmission. To further illustrate, the network node 305 may apply one or more precoding matrices to the downlink transmission 346 in accordance with the precoder information 344 and may limit amplitude of the downlink transmission 346 in accordance with the amplitude backoff values 308. The network node 305 may perform the downlink transmission 346 via the TRPs 314, and the UE 315 may receive the downlink transmission 346 via the TRPs 314.

In some examples, the network node 305 may dynamically select the amplitude backoff values 308, such as by selecting the amplitude backoff values 308 in accordance one or more characteristics or parameters of the downlink transmission 346. To illustrate, the network node 305 may dynamically select the amplitude backoff values 308 in accordance with one or more of a set of spatial beams associated with the downlink transmission 346, a component carrier associated with the downlink transmission 346, a bandwidth part (BWP) associated with the downlink transmission 346, or a transmission time interval (TTI) associated with the downlink transmission 346, as illustrative examples.

In some examples, the message 330 may include or correspond to a control message. To further illustrate, the message 330 may correspond to a downlink control information (DCI) message, a radio resource control (RRC) message, or a medium access control (MAC) control element (MAC-CE) message. In some examples, the message 330 may correspond to a scheduling DCI message that schedules the downlink transmission 346.

By updating the initial precoder information 328 based on the power adjustment information 332, the network node 305 may avoid using PMIs that may involve or necessitate clipping or limiting power of one or more of the TRPs 314, which may be associated with less effective or suboptimal precoding. Accordingly, the UE 315 may in some instances perform a "second pass" to determine the precoder information 344 (e.g., a refinement of the initial precoder information 328) to avoid such clipping or limiting of TRP power, thus enabling improved precoder selection and improved reliability of communication between the UE 315 and the network node 305.

Figure 4:
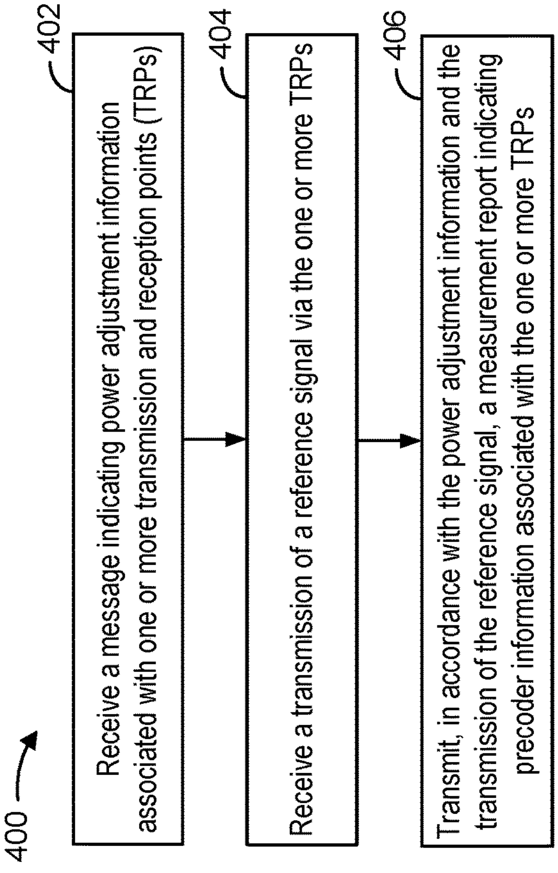
FIG. 4 is a flow diagram illustrating an example process that supports precoder selection using power adjustment information according to one or more aspects.

FIG. 4 is a flow diagram illustrating an example process 400 that supports precoder selection using power adjustment information according to one or more aspects. In some examples, the UE 315 may perform the process 400.

At 402, the process 400 includes receiving a message indicating power adjustment information associated with one or more transmission and reception points (TRPs). For example, the UE 315 may receive the message 330 indicating the power adjustment information 332. The power adjustment information 332 may be associated with one or more of the TRPs 314.

At 404, the process 400 further includes receiving a transmission of a reference signal via the one or more TRPs. For example, the UE 315 may receive the transmission 340 of the reference signal 322 via one or more of the TRPs 314.

At 406, the process 400 further includes transmitting, in accordance with the power adjustment information and the transmission of the reference signal, a measurement report indicating precoder information associated with the one or more TRPs. For example, the UE 315 may transmit the measurement report 342 in accordance with the power adjustment information 332 and the transmission 340 of the reference signal 322. The measurement report 342 may indicate the precoder information 344 associated with one or more of the TRPs 314.

Figure 5:
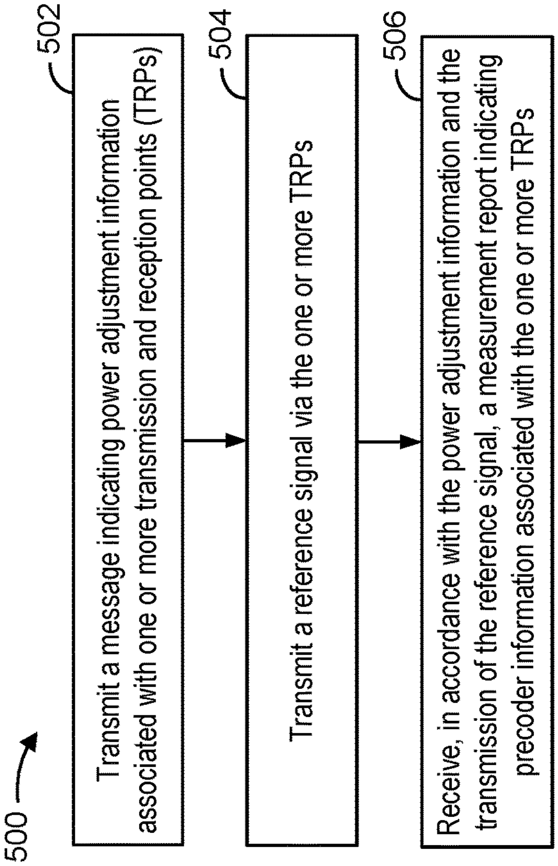
FIG. 5 is a flow diagram illustrating another example process that supports precoder selection using power adjustment information according to one or more aspects.

FIG. 5 is a flow diagram illustrating another example process that supports precoder selection using power adjustment information according to one or more aspects. In some examples, the network node 305 may perform the process 500.

At 502, the process 500 includes transmitting a message indicating power adjustment information associated with one or more transmission and reception points (TRPs). For example, the network node 305 may transmit the message 330 indicating the power adjustment information 332. The power adjustment information 332 may be associated with one or more of the TRPs 314.

At 504, the process 500 further includes transmitting a reference signal via the one or more TRPs. For example, the network node 305 may transmit the reference signal 322 via the transmission 340.

At 506, the process 500 further includes receiving, in accordance with the power adjustment information and the transmission of the reference signal, a measurement report indicating precoder information associated with the one or more TRPs.

Figure 6:
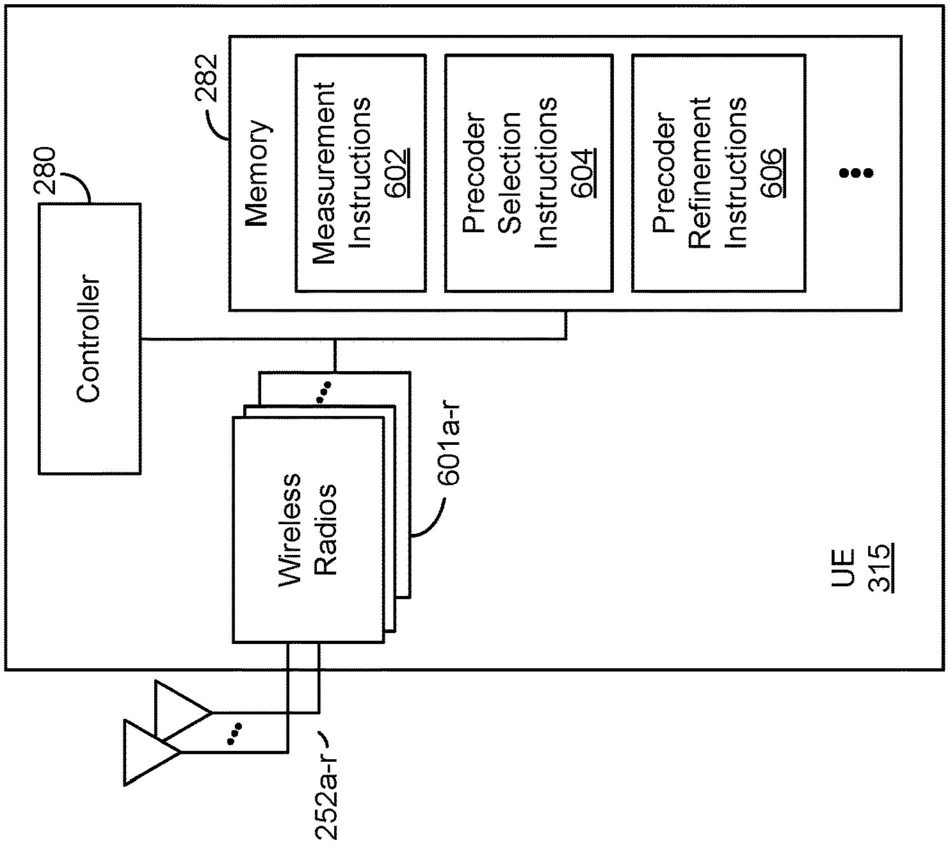
FIG. 6 is a block diagram of an example UE that supports precoder selection using power adjustment information according to one or more aspects.

FIG. 6 is a block diagram of an example UE 315 that supports precoder selection using power adjustment information according to one or more aspects. The UE 315 may include structure, hardware, or components illustrated in FIG. 2. For example, the UE 315 may include the controller 280, which may execute instructions stored in the memory 282. Using the controller 280, the UE 315 may transmit and receive signals via wireless radios 601*a-r* and antennas 252*a-r*. The wireless radios 601*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

In some examples, the memory 282 may store instructions executable by one or more processors (e.g., the controller 280) to initiate, perform, or control one or more operations described herein. For example, the memory 282 may store measurement instructions 602 executable by the one or more processors to perform measurements of the reference signal 322. The memory 282 may also store precoder selection instructions 604 executable by the one or more processors to determine the initial precoder information 328, such as in accordance with in accordance with Equation 1, above. The memory 282 may also store precoder refinement instructions 606 executable by the one or more processors to determine the precoder information 344, such as in accordance with in accordance with any of Equations 3-6, above.

Figure 7:
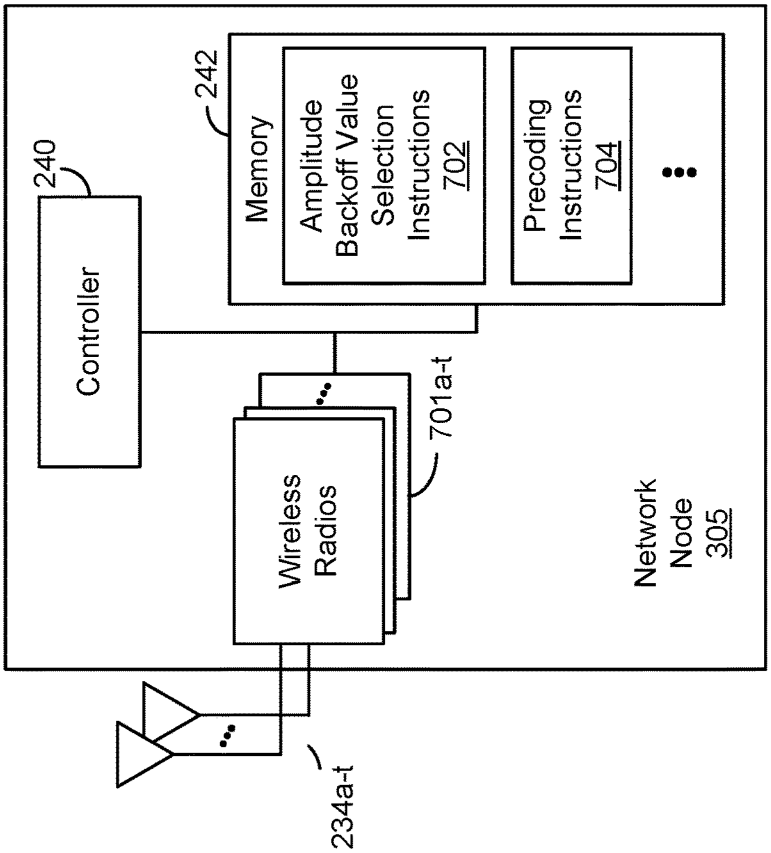
FIG. 7 is a block diagram of an example base station that supports precoder selection using power adjustment information according to one or more aspects.

FIG. 7 is a block diagram of an example network node 305 that supports precoder selection using power adjustment information according to one or more aspects. The network node 305 may include structure, hardware, and components illustrated in FIG. 2. For example, the network node 305 may include the controller 240, which may execute instructions stored in memory 242. Under control of the controller 240, the network node 305 may transmit and receive signals via wireless radios 701*a-t* and antennas 234*a-t*. The wireless radios 701*a-t* may include one or more components or devices described herein, such as the modulator/demodulators 232*a-t*, the MIMO detector 236, the receive processor 238, the transmit processor 220, the TX MIMO processor 230, one or more other components or devices, or a combination thereof.

In some examples, the memory 242 may store instructions executable by one or more processors (e.g., the controller 240) to initiate, perform, or control one or more operations described herein. For example, the memory 242 may store amplitude backoff value selection instructions 702 executable by the one or more processors to determine the amplitude backoff values 308, such as in accordance with Equation 2, above. As another example, the memory 242 may store precoding instructions 704 executable by the one or more processors to precode one or more signals, such as by precoding the downlink transmission 346 in accordance with the precoder information 344.

To further illustrate, in a first aspect, an apparatus for wireless communication by a user equipment (UE) includes a receiver and a transmitter. The receiver is configured to receive a message indicating power adjustment information associated with one or more transmission and reception points (TRPs) and to receive a transmission of a reference signal via the one or more TRPs. The transmitter is configured to transmit, in accordance with the power adjustment information and the transmission of the reference signal, a measurement report indicating precoder information associated with the one or more TRPs.

In a second aspect, in combination with the first aspect, the power adjustment information is associated with one or more amplitude backoff values respectively associated with the one or more TRPs.

In a third aspect, in combination with one or more of the first aspect or the second aspect, the power adjustment information includes the one or more amplitude backoff values.

In a fourth aspect, in combination with one or more of the first aspect through the third aspect, the power adjustment information includes one or more index values to a lookup table indicating the one or more amplitude backoff values.

In a fifth aspect, in combination with one or more of the first aspect through the fourth aspect, the receiver is further configured to receive a downlink transmission via the one or more TRPs and in accordance with the one or more amplitude backoff values.

In a sixth aspect, in combination with one or more of the first aspect through the fifth aspect, the one or more amplitude backoff values are in accordance with one or more of a set of spatial beams associated with the downlink transmission a component carrier associated with the downlink transmission, a bandwidth part (BWP) associated with the downlink transmission, or a transmission time interval (TTI) associated with the downlink transmission.

In a seventh aspect, in combination with one or more of the first aspect through the sixth aspect, the power adjustment information includes an indication of a particular TRP of the one or more TRPs that is associated with the power adjustment information.

In an eighth aspect, in combination with one or more of the first aspect through the seventh aspect, the indication includes one or more of a channel resource indicator (CRI) associated with the particular TRP, a value associated with the particular TRP, or a bitmap associated with the one or more TRPs.

In a ninth aspect, in combination with one or more of the first aspect through the eighth aspect, the receiver is further configured to receive a non-joint transmission of the reference signal, the transmitter is further configured to transmit, in accordance with the non-joint transmission of the reference signal, channel state information (CSI) feedback indicating initial precoder information, and the power adjustment information is in accordance with the initial precoder information.

In a tenth aspect, in combination with one or more of the first aspect through the ninth aspect, the CSI feedback is associated with a first periodicity, and the measurement report is associated with a second periodicity that is different than the first periodicity.

In an eleventh aspect, in combination with one or more of the first aspect through the tenth aspect, the CSI feedback and the measurement report are associated with a same periodicity.

In a twelfth aspect, a method of wireless communication performed by a user equipment (UE) includes receiving a message indicating power adjustment information associated with one or more transmission and reception points (TRPs). The method further includes receiving a transmission of a reference signal via the one or more TRPs and transmitting, in accordance with the power adjustment information and the transmission of the reference signal, a measurement report indicating precoder information associated with the one or more TRPs.

In a thirteenth aspect, in combination with the twelfth aspect, the power adjustment information is associated with one or more amplitude backoff values respectively associated with the one or more TRPs.

In a fourteenth aspect, in combination with one or more of the twelfth aspect through the thirteenth aspect, the power adjustment information includes the one or more amplitude backoff values.

In a fifteenth aspect, in combination with one or more of the twelfth aspect through the fourteenth aspect, the power adjustment information includes one or more index values, and the method further includes accessing a lookup table in accordance with the one or more index values to determine the one or more amplitude backoff values.

In a sixteenth aspect, in combination with one or more of the twelfth aspect through the fifteenth aspect, the method further includes receiving a downlink transmission via the one or more TRPs and in accordance with the one or more amplitude backoff values.

In a seventeenth aspect, in combination with one or more of the twelfth aspect through the sixteenth aspect, the one or more amplitude backoff values are dynamically selected in accordance with one or more of a set of spatial beams associated with the downlink transmission, a component carrier associated with the downlink transmission, a bandwidth part (BWP) associated with the downlink transmission, or a transmission time interval (TTI) associated with the downlink transmission.

In an eighteenth aspect, in combination with one or more of the twelfth aspect through the seventeenth aspect, the power adjustment information includes an indication of a particular TRP of the one or more TRPs that is associated with the power adjustment information.

In a nineteenth aspect, in combination with one or more of the twelfth aspect through the eighteenth aspect, the indication includes one or more of a channel resource indicator (CRI) associated with the particular TRP, a value associated with the particular TRP, or a bitmap associated with the one or more TRPs.

In a twentieth aspect, in combination with one or more of the twelfth aspect through the nineteenth aspect, the method further includes receiving a non-joint transmission of the reference signa and transmitting, in accordance with the non-joint transmission of the reference signal, channel state information (CSI) feedback indicating initial precoder information. The power adjustment information is in accordance with the initial precoder information.

In a twenty-first aspect, in combination with one or more of the twelfth aspect through the twentieth aspect, the CSI feedback is associated with a first periodicity, and the measurement report is associated with a second periodicity that is different than the first periodicity.

In a twenty-second aspect, in combination with one or more of the twelfth aspect through the twenty-first aspect, the CSI feedback and the measurement report are associated with a same periodicity.

In a twenty-third aspect, an apparatus for wireless communication by a network node includes a transmitter and a receiver. The transmitter is configured to transmit a message indicating power adjustment information associated with one or more transmission and reception points (TRPs) and to transmit a reference signal via the one or more TRPs. The receiver is configured to receive, in accordance with the power adjustment information and the transmission of the reference signal, a measurement report indicating precoder information associated with the one or more TRPs.

In a twenty-fourth aspect, in combination with the twenty-third aspect, the power adjustment information is associated with one or more amplitude backoff values respectively associated with the one or more TRPs.

In a twenty-fifth aspect, in combination with one or more of the twenty-third aspect through the twenty-fourth aspect, the power adjustment information includes the one or more amplitude backoff values.

In a twenty-sixth aspect, in combination with one or more of the twenty-third aspect through the twenty-fifth aspect, the power adjustment information includes one or more index values to a lookup table indicating the one or more amplitude backoff values.

In a twenty-seventh aspect, a method of wireless communication performed by a network node includes transmitting a message indicating power adjustment information associated with one or more transmission and reception points (TRPs). The method further includes transmitting a reference signal via the one or more TRPs and receiving, in accordance with the power adjustment information and the transmission of the reference signal, a measurement report indicating precoder information associated with the one or more TRPs.

In a twenty-eighth aspect, in combination with the twenty-seventh aspect, the method further includes performing a non-joint transmission of the reference signal and receiving, in accordance with the non-joint transmission of the reference signal, channel state information (CSI) feedback indicating initial precoder information. The power adjustment information is in accordance with the initial precoder information.

In a twenty-ninth aspect, in combination with one or more of the twenty-seventh aspect through the twenty-eighth aspect, the CSI feedback is associated with a first periodicity, and the measurement report is associated with a second periodicity that is different than the first periodicity.

In a thirtieth aspect, in combination with one or more of the twenty-seventh aspect through the twenty-ninth aspect, the CSI feedback and the measurement report are associated with a same periodicity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would also understand that one or more illustrative logics, logical blocks, modules, circuits, and processes described herein may be implemented using hardware, software, or combinations of both. Whether such functionality is implemented using hardware or software may depend upon the particular application and design of the overall system.

A hardware and data processing apparatus used to implement one or more illustrative logics, logical blocks, modules, circuits, and processes described herein may be implemented or performed using a single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, one or more functions described herein may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. One or more operations of a method or process described herein may be implemented in a processor-executable software module which may reside on a computer-readable medium. Computer-readable media both computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, one or more operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) for wireless communication, the UE comprising:

a receiver configured to receive a message indicating power adjustment information associated with a plurality of transmission and reception points (TRPs) and to receive a transmission of a reference signal via the plurality of TRPs, wherein the power adjustment information includes an indication that the power adjustment information is associated with at least a particular TRP among the plurality of TRPs and is further associated with a particular TRP amplitude backoff value that is to be applied at the particular TRP; and a transmitter configured to transmit, in accordance with the power adjustment information and the transmission of the reference signal, a measurement report indicating precoder information associated with the plurality of TRPs.

2. The UE of claim 1, wherein the power adjustment information is associated with a plurality of amplitude backoff values respectively associated with the plurality of TRPs, and wherein the plurality of amplitude backoff values include the particular TRP amplitude backoff value.

3. The UE of claim 2, wherein the power adjustment information includes the plurality of amplitude backoff values.

4. The UE of claim 2, wherein the power adjustment information includes one or more index values to a lookup table indicating the plurality of amplitude backoff values.

5. The UE of claim 2, wherein the receiver is further configured to receive a downlink transmission via the plurality of TRPs and in accordance with the plurality of amplitude backoff values.

6. The UE of claim 5, wherein the plurality of amplitude backoff values are in accordance with one or more of:

a set of spatial beams associated with the downlink transmission;

a component carrier associated with the downlink transmission;

a bandwidth part (BWP) associated with the downlink transmission; or a transmission time interval (TTI) associated with the downlink transmission.

7. The UE of claim 1, wherein the indication includes one or more of a channel resource indicator (CRI) associated with the particular TRP, an index value associated with the particular TRP, or a bitmap associated with the plurality of TRPs.

8. The UE of claim 1, wherein the receiver is further configured to receive a non-joint transmission of the reference signal, wherein the transmitter is further configured to transmit, in accordance with the non-joint transmission of the reference signal, channel state information (CSI) feedback indicating initial precoder information, and wherein the power adjustment information is in accordance with the initial precoder information.

9. The UE of claim 8, wherein the CSI feedback is associated with a first periodicity, and wherein the measurement report is associated with a second periodicity that is different than the first periodicity.

10. The UE of claim 8, wherein the CSI feedback and the measurement report are associated with a same periodicity.

11. The UE of claim 1, wherein the indication includes a bitmap associated with the plurality of TRPs.

12. The UE of claim 11, wherein the bitmap includes a plurality of bits each corresponding to a respective TRP of the plurality of TRPs, and wherein the plurality of bits includes a particular bit indicating that the particular TRP is associated with the particular TRP amplitude backoff value.

13. A method of wireless communication performed by a user equipment (UE), the method comprising:

receiving a message indicating power adjustment information associated with a plurality of transmission and reception points (TRPs), wherein the power adjustment information includes an indication that the power adjustment information is associated with at least a particular TRP among the plurality of TRPs and is further associated with a particular TRP amplitude backoff value that is to be applied at the particular TRP;

receiving a transmission of a reference signal via the plurality of TRPs; and transmitting, in accordance with the power adjustment information and the transmission of the reference signal, a measurement report indicating precoder information associated with the plurality of TRPs.

14. The method of claim 13, wherein the power adjustment information is associated with a plurality of amplitude backoff values respectively associated with the plurality of TRPs, and wherein the plurality of amplitude backoff values include the particular TRP amplitude backoff value.

15. The method of claim 14, wherein the power adjustment information includes the plurality of amplitude backoff values.

16. The method of claim 14, wherein the power adjustment information includes one or more index values, the method further comprising accessing a lookup table in accordance with the one or more index values to determine the plurality of amplitude backoff values.

17. The method of claim 14, further comprising receiving a downlink transmission via the plurality of TRPs and in accordance with the plurality of amplitude backoff values.

18. The method of claim 17, wherein the plurality of amplitude backoff values are dynamically selected in accordance with one or more of:

a set of spatial beams associated with the downlink transmission;

a component carrier associated with the downlink transmission;

a bandwidth part (BWP) associated with the downlink transmission; or a transmission time interval (TTI) associated with the downlink transmission.

19. The method of claim 13, wherein the indication includes one or more of a channel resource indicator (CRI) associated with the particular TRP, an index value associated with the particular TRP, or a bitmap associated with the plurality of TRPs.

20. The method of claim 13, further comprising:

receiving a non-joint transmission of the reference signal; and transmitting, in accordance with the non-joint transmission of the reference signal, channel state information (CSI) feedback indicating initial precoder information, wherein the power adjustment information is in accordance with the initial precoder information.

21. The method of claim 20, wherein the CSI feedback is associated with a first periodicity, and wherein the measurement report is associated with a second periodicity that is different than the first periodicity.

22. The method of claim 20, wherein the CSI feedback and the measurement report are associated with a same periodicity.

23. A network node for wireless communication, the network node comprising:

a transmitter configured to transmit a message indicating power adjustment information associated with a plurality of transmission and reception points (TRPs) and to transmit a reference signal via the plurality of TRPs, wherein the power adjustment information includes an indication that the power adjustment information is associated with at least a particular TRP among the plurality of TRPs and is further associated with a particular TRP amplitude backoff value that is to be applied at the particular TRP; and a receiver configured to receive, in accordance with the power adjustment information and the transmission of the reference signal, a measurement report indicating precoder information associated with the plurality of TRPs.

24. The network node of claim 23, wherein the power adjustment information is associated with a plurality of amplitude backoff values respectively associated with the plurality of TRPs, and wherein the plurality of amplitude backoff values include the particular TRP amplitude backoff value.

25. The network node of claim 24, wherein the power adjustment information includes the plurality of amplitude backoff values.

26. The network node of claim 24, wherein the power adjustment information includes one or more index values to a lookup table indicating the plurality of amplitude backoff values.

27. A method of wireless communication performed by a network node, the method comprising:

transmitting a message indicating power adjustment information associated with a plurality of transmission and reception points (TRPs), wherein the power adjustment information includes an indication that the power adjustment information is associated with at least a particular TRP among the plurality of TRPs and is further associated with a particular TRP amplitude backoff value that is to be applied at the particular TRP;

transmitting a reference signal via the plurality of TRPs; and receiving, in accordance with the power adjustment information and the transmission of the reference signal, a measurement report indicating precoder information associated with the plurality of TRPs.

28. The method of claim 27, further comprising:

performing a non-joint transmission of the reference signal; and receiving, in accordance with the non-joint transmission of the reference signal, channel state information (CSI) feedback indicating initial precoder information, wherein the power adjustment information is in accordance with the initial precoder information.

29. The method of claim 28, wherein the CSI feedback is associated with a first periodicity, and wherein the measurement report is associated with a second periodicity that is different than the first periodicity.

30. The method of claim 28, wherein the CSI feedback and the measurement report are associated with a same periodicity.

* * * * *